United States Patent
McAndrew et al.

(10) Patent No.: US 9,105,080 B2
(45) Date of Patent: Aug. 11, 2015

(54) METHOD AND A SYSTEM FOR CALIBRATING AN IMAGE CAPTURE DEVICE

(75) Inventors: Fintan McAndrew, County Galway (IE); Armin Zeller, Munich (DE); Peter Bone, East Sussex (GB); Trevor Ian Kellaway, East Sussex (GB); Sascha Wilhelm, Wolnzach (DE)

(73) Assignees: HI-KEY LIMITED, Tuam, County Galway (IE); BAYERISCHE MOTOREN WERKE, Munich (DE); APPLICATION SOLUTIONS (ELECTRONICS AND VISION) LTD, East Sussex (GB)

( * ) Notice: Subject to any disclaimer, the term of this patent is extended or adjusted under 35 U.S.C. 154(b) by 455 days.

(21) Appl. No.: 13/121,722

(22) PCT Filed: Oct. 1, 2008

(86) PCT No.: PCT/IE2008/000094
§ 371 (c)(1),
(2), (4) Date: May 11, 2011

(87) PCT Pub. No.: WO2010/038224
PCT Pub. Date: Apr. 8, 2010

(65) Prior Publication Data
US 2011/0216201 A1 Sep. 8, 2011

(51) Int. Cl.
*H04N 17/00* (2006.01)
*G06T 7/00* (2006.01)
(52) U.S. Cl.
CPC ..... *G06T 7/0018* (2013.01); *G06T 2207/10016* (2013.01); *G06T 2207/30252* (2013.01)
(58) Field of Classification Search
CPC .................. G06K 9/00; G06T 7/0018; G06T 2207/30252; G06T 2207/10016
USPC .................................................. 348/148, 154
See application file for complete search history.

(56) References Cited

U.S. PATENT DOCUMENTS 5,990,941 A * 11/1999 Jackson et al. ........... 348/207.99
6,285,393 B1 * 9/2001 Shimoura et al. ............. 348/119
(Continued)

FOREIGN PATENT DOCUMENTS

| DE | 199 62 997 A1 | 6/2001 |
| DE | 10 2006 044615 A1 | 3/2008 |
| EP | 1 710 749 A1 | 10/2006 |

OTHER PUBLICATIONS

International Search Report from PCT/IE2008/000094 dated Jun. 5, 2009 (3 pages).

(Continued)

*Primary Examiner* — Jay Patel
*Assistant Examiner* — Frank Huang
(74) *Attorney, Agent, or Firm* — Osha Liang LLP (57) ABSTRACT

A system (1) for calibrating an image capture device (2) mounted on a motor vehicle for offset from an ideal position and an ideal angular orientation while the vehicle is moving comprises selecting an image (12) in a captured image frame (10) of a stationary object relative to the motor vehicle, which is capable of being tracked through a plurality of successively captured image frames (14a,14d), predicting the locations at which the target image (12b) should appear in the respective successively captured image frames (14a,14d), comparing the actual location of the target image (12a) in the respective successively captured image frames (14a,14d) with the respective predicted locations (12b) and determining calibration values for the camera (2) from the results of the comparison, in the event that the actual (12a) and predicted locations (12b) of the target image in the respective image frames (14a,14d) do not coincide.

14 Claims, 3 Drawing Sheets

(56) References Cited

U.S. PATENT DOCUMENTS

| | | | |
|---|---|---|---|
| 6,563,532 B1* | 5/2003 | Strub et al. | 348/158 |
| 2007/0115357 A1* | 5/2007 | Stein et al. | 348/148 |
| 2008/0144924 A1* | 6/2008 | Hoffmann | 382/154 |

OTHER PUBLICATIONS

A. Ruf, et al.; "Visual Tracking of an End-Effector by Adaptive Kinematic Prediction"; Intelligent Robots and Systems, 1997, IROS '97; Proceedings of the 1997 IEEE/RSJ International Conference on Grenoble, France; Sep. 7-11, 1997; New York, New York, USA, IEEE, US, vol. 2; Sep. 7, 1997; pp. 893-898 (6 pages).

Yi-Ping Hung; "A Simple Real-Time Method for Calibrating a Camera Mounted on a Robot for Three Dimensional Machine Vision"; Proceedings of the SPIE, SPIE, Bellingham, VA, US; vol. 1005; Jan. 1, 1989; pp. 12-19 (8 pages).

\* cited by examiner

Fig. 1

METHOD AND A SYSTEM FOR CALIBRATING AN IMAGE CAPTURE DEVICE

The present invention relates to a method and a system for calibrating an image capture device, such as an image capture device mounted on a motor vehicle for offset from at least one of an ideal horizontal or vertical position and an ideal angular orientation about a focal axis of the image capture device while the vehicle is moving, and in particular, the invention relates to a method and a system for calibrating an image capture device which may be mounted in the side mirrors of a motor vehicle or to the front or rear of a motor vehicle for offset from both an ideal position and an ideal angular orientation about the focal axis of the image capture device.

The provision of one or more image capture devices on a motor vehicle as an aid to a driver is becoming increasingly more common. Such image capture devices may be analogue or digital cameras, and typical cameras are CMOS cameras and charge coupled device (CCD) cameras. Such cameras may be mounted to the rear of the motor vehicle, on the side mirrors of the motor vehicle, or to the front of the motor vehicle. In general, such cameras are located externally of the motor vehicle, but may be located in the interior thereof. When mounted to the rear of the motor vehicle and in the side mirrors, such cameras are commonly used to provide a downwardly looking plan view image, which is commonly referred to as a bird's eye view image of areas adjacent the rear of the vehicle and on respective opposite sides thereof. Such plan view images are displayed on a dashboard mounted visual display screen in order to assist the driver in manoeuvring the vehicle in confined spaces. Rear view mounted cameras may also be adapted to produce an image which may be processed by a suitable image processor in order to present an image to the driver which may be varied, so that if the vehicle is reversing, as the speed of the vehicle increases, the field of view of the image presented to the driver is raised in order to increase the area of the image extending from the rear of the vehicle presented to the driver on the visual display screen.

Forward mounted cameras in general produce an image on the visual display screen looking forwardly of the vehicle, or to the respective sides of the vehicle. Needless to say, the position of such cameras on a motor vehicle is not limited to rearwardly or forwardly mounted cameras or side mirror mounted cameras.

The images captured by such cameras, in general, are processed in order to alter the field of view of the images presented on the visual display screen. In general, the cameras are located in a fixed position on the motor vehicle, and are not moveable. The altering of the field of view of the image is carried out by image processing. This will be well known to those skilled in the art.

However, in order that the image when processed for display to the driver is an accurate representation of the area adjacent the motor vehicle, the position and orientation of the cameras relative to the motor vehicle must be calibrated. During factory mounting of cameras on a motor vehicle, such calibration is carried out at the factory, and is commonly referred to as factory calibration. Factory calibration is carried out on a special purpose jig with the vehicle located on the jig in a precise known location, and the floor and, if appropriate, side and end walls of the jig being provided with high precision target designs at known locations relative to the motor vehicle. The cameras are focused on the design and calibrated based on the image frames captured by the cameras. Factory calibration will be well known to those skilled in the art.

However, during normal driving of the motor vehicle, the cameras may become misaligned, for example, as a result of the vehicle being involved in a relatively minor crash, and indeed as a result of one vehicle bumping lightly into another. Once a camera has been knocked out of alignment, the image frames captured by the camera when processed no longer present the driver with an accurate image of the area adjacent the vehicle. This is particularly so in the case of side mirror mounted cameras and rearward mounted cameras which are adapted to produce a bird's eye view image of the ground adjacent the rear and sides of the vehicle.

Thus, when a camera becomes misaligned, in general, the only effective way of correcting the misalignment is to have the cameras recalibrated. This requires returning the vehicle to a repair garage which has the necessary equipment to recalibrate the cameras. This is undesirable, since firstly, it results in the driver being without a car, possibly for one or more days, and secondly, a driver may have to wait a week or more before a repair garage can commence recalibrating the camera. During this period the misaligned camera or cameras are unserviceable, and the car thus must be driven without the benefit of the camera or cameras.

There is therefore a need for a method and a system for calibrating an image capture device which addresses this problem.

The present invention is directed towards providing such a method and a system.

According to the invention there is provided a method for calibrating an image capture device mounted on a vehicle for offset from at least one of an ideal position and an ideal angular orientation about a focal axis of the image capture device while the vehicle is moving, the method comprising:

selecting an image frame captured by the image capture device as a reference image frame, selecting as a target image an image of a stationary object in an environment external of the vehicle in the reference image frame suitable as a target object, predicting a location at which an image of the target object should appear in a subsequently captured image frame in response to at least one parameter of the moving vehicle, comparing the actual location of the image of the target object in the subsequently captured image frame with the predicted location thereof, determining from the comparison of the actual and the predicted locations of the images of the target object if the image capture device is offset from the at least one of the ideal position and the ideal angular orientation, and determining calibration data from the difference between the actual and the predicted locations of the image of the target object for applying to image frames later captured by the image capture device for correcting the later captured image frames for the offset of the image capture device from the at least one of the ideal position and the ideal angular orientation if the image capture device is determined to be offset therefrom.

Preferably, the locations at which the images of the target object should appear in a plurality of respective subsequently captured image frames are predicted, and the actual locations of the images of the target object in the said subsequently captured image frames are compared with the corresponding predicted locations thereof. Advantageously the differences between the actual locations of the images of the target object and the predicted locations thereof in the said respective subsequently captured image frames are averaged for determining the calibration data. Ideally, the said subsequently captured image frames are sequentially captured image frames.

In one embodiment of the invention a captured image frame is selected as being a reference image frame if image data thereof in the time domain in at least a portion of the image frame is indicative of a high spatial frequency content greater than a predefined high spatial frequency content.

Preferably, at least some of the image data in the time domain representative of the captured image frames is passed through a high pass filter for determining if the image frame contains a target image. Advantageously, the high pass filter is a high pass 3×3 convolution mask.

In another embodiment of the invention the target image is selected from an area of predefined size forming a target image area in the reference image frame, and the location at which the image area corresponding to the target image area should appear in each of the said subsequently captured image frames is predicted, and the actual image of the area corresponding to the target image area at the predicted location in each of the said subsequently captured image frames is compared with the target image area for determining the difference between the actual location of the image of the target object with the predicted location thereof. Preferably, the location of the target image area in the reference image frame is at a predefined location therein.

Preferably, the predefined location of the target image area is selected to be at a location in the reference image frame to produce optimum results from the comparison of the actual and the predicted locations of the images of the target object in response to the at least one of the parameters of the moving vehicle.

Preferably, the captured image frame selected as the reference image frame is an image frame comprising a target image in the target image area which is distinctive within the target image area.

In one embodiment of the invention the actual image of the area corresponding to the target image area at the predicted location in each of the said subsequently captured image frames is compared with the target image area by a template matching process. Preferably, the actual image of the area corresponding to the target image area at the predicted location in each of the said subsequently captured image frames is compared with the target image area by comparing image data in the frequency domain representative of the actual image of the area corresponding to the target image area at the predicted location with image data in the frequency domain representative of the target image area. Advantageously, the image data in the frequency domain representative of the actual image of the area corresponding to the target image area at the predicted location in each of the said subsequently captured image frames is compared with the image data in the frequency domain representative of the predefined target image area by a cross-correlation process to produce a joint power spectrum of the actual image of the area at the corresponding predicted location and the predefined target image area.

Ideally, the location of the peak of maximum peak value in the correlation plane of each joint power spectrum is determined for determining the difference between the actual location of the image of the target object and the predicted location thereof for the corresponding subsequently captured image plane.

In one embodiment of the invention which the peak value of the peak of maximum peak value in the correlation plane of each joint power spectrum is compared to a predefined threshold peak value for determining if the peak of maximum peak value is a valid peak. Preferably, the average peak value of the peak value of the peaks in the correlation plane of each joint power spectrum is computed, and a ratio is computed of the peak value of the peak of maximum peak value to the computed average peak value for each joint power spectrum, and the computed ratio is compared with a predefined threshold ratio value for determining if the peak of maximum peak value is a valid peak.

In a further embodiment of the invention the location of the image of the target object in each of the said subsequent image frames is predicted in response to at least one of the following parameters of the moving vehicle:
the forward/rearward direction of movement of the vehicle,
the speed of movement of the vehicle, and
the steering angle of the steerable wheels of the vehicle.

Preferably, the captured image frames are initially corrected for one or more of the following distortions:
perspective distortion, and
fisheye distortion, and
preferably, are subsequently converted to top plan view images prior to being processed by the calibration method.

In one embodiment of the invention the captured image frames are image frames of the ground surface over which the vehicle is traversing.

Preferably, the calibration data is determined during respective periods while the vehicle is travelling in a straight line direction and in an arc.

Preferably, each calibration is carried out while the vehicle is travelling at a speed below a predetermined threshold speed.

Advantageously, each calibration is carried out with the vehicle travelling in a generally forward direction.

Preferably, the calibration data prepared from a plurality of calibrations is averaged.

Advantageously, calibration data is prepared during each driving period of the vehicle. Preferably, calibration data prepared during each driving period of the vehicle is averaged during that driving period.

Ideally, calibration data prepared during each driving period is applied to captured image frames which are captured in the immediately following driving period.

In one embodiment of the invention the calibration data is prepared to correct for offset of the image capture device from an ideal position.

In another embodiment of the invention the calibration data is prepared to correct for offset of the image capture device from an ideal angular orientation about the focal length of the image capture device.

Preferably, signals representative of the captured image frames are digitised.

The invention also provides a system for calibrating an image capture device mounted on a vehicle for offset from at least one of an ideal position and an ideal angular orientation while the vehicle is moving, the system comprising:
a means for selecting an image frame captured by the image capture device as a reference image frame,
a means for selecting as a target image an image of a stationary object in an environment external of the vehicle in the reference image frame suitable as a target object,
a means for predicting a location at which an image of the target object should appear in a subsequently captured image frame in response to at least one parameter of the moving vehicle,
a means for comparing the actual location of the image of the target object in the subsequently captured image frame with the predicted location thereof,
a means for determining from the comparison of the actual and the predicted locations of the images of the target object if the image capture device is offset from the at least one of the ideal position and the ideal angular orientation, and a means for determining calibration data from the difference between the actual and the predicted locations of the images of the target object for applying to image frames later captured by the image capture device for correcting the later captured image frames for the offset of the image capture device from the at least one of the ideal position and the ideal angular orientation if the image capture device is determined to be offset therefrom.

The advantages of the invention are many. By virtue of the fact that calibration of the image capture device is carried out while the vehicle is moving, the need for calibration during servicing of a vehicle is no longer required. Additionally, if during normal wear and tear of the vehicle an image capture device becomes misaligned or offset from its correct position and/or angular orientation, the fact that calibration of the image capture device is carried out while the vehicle is moving ensures that any such misalignment or offset is corrected for during the next calibration of the image capture device. This, of course, is provided that the misalignment or offset of the image capture device is not excessive, and is correctable without having to physically remount the image capture device.

Additionally, by virtue of the fact that the calibration is carried out in the background independently of other processing of the captured images for display on a visual display unit, the calibration does not affect the normal operation of the image capture device, nor the normal processing and displaying of images on a visual display screen to a driver.

A further advantage of the invention is that by virtue of the fact that calibration of the image capture device is carried out on an ongoing basis, time spent in factory calibration of the image capture device can be reduced.

The invention will be more clearly understood from the following description of a preferred embodiment thereof, which is given by way of example only, with reference to the accompanying drawings, in which:

Figure 1:
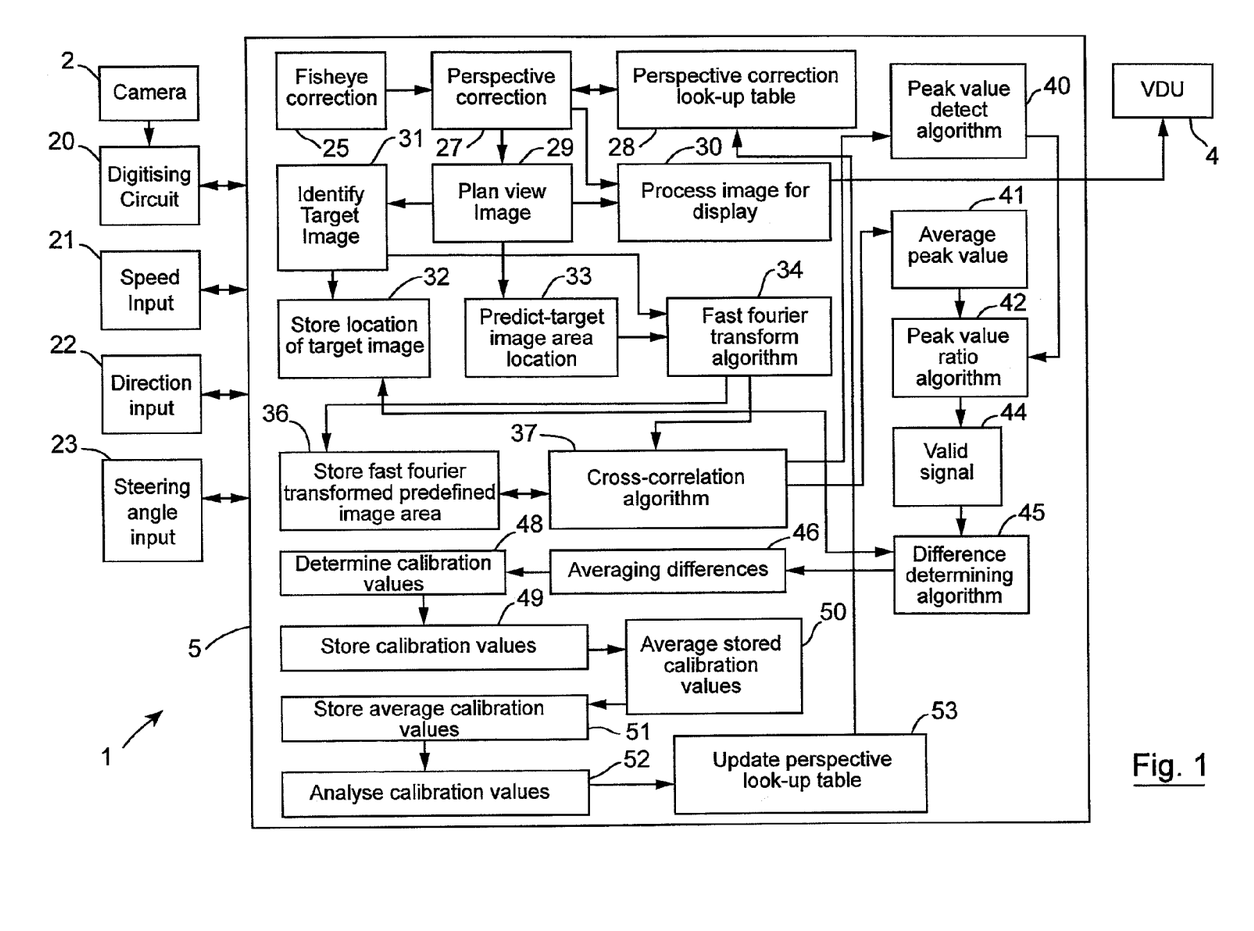
FIG. 1 is a block representation of a system according to the invention for calibrating an image capture device mounted on a vehicle.

Referring to the drawings, there is illustrated a system according to the invention, indicated generally by the reference numeral 1, for calibrating an image capture device, namely, a camera 2 which is mounted on a motor vehicle (not shown) for correcting for offset of the camera 2 relative to the motor vehicle from an ideal position and an ideal angular orientation around a central focal axis of the camera 2. The camera 2 may be any suitable type of image capture device. It may be a camera of the type commonly referred to as a digital camera, or it may be a camera of the type commonly referred to as an analogue camera. Such digital and analogue cameras may be, for example, CMOS cameras, charged coupled device (CCD) cameras and the like. A typical CMOS digital camera would be a CMOS camera producing image frames of 640 pixels in the X direction and 480 pixels in the Y direction, at a rate of thirty image frames per second.

The camera 2 may be mounted in any desired location on the motor vehicle, for example, the camera 2 may be mounted to the rear of the motor vehicle for capturing images to the rear of the motor vehicle for displaying on a visual display screen 4, for example, a dashboard mounted visual display screen for presenting images captured by the camera 2 to a driver of the vehicle. Such rearward images may be downwardly looking plan view images of an area to the rear of the motor vehicle for use in assisting the driver to carry out reverse manoeuvring of the vehicle in a confined space, or the rearward images may be images looking in a generally rearward direction from the vehicle.

Alternatively, the camera 2 may be mounted on a side mirror of the motor vehicle for capturing a downward looking plan view image of the ground adjacent the side of the vehicle for display on the display screen 4, and also for assisting the driver in carrying out manoeuvring of the vehicle in a confined space, for example, for parking, and in particular, parking the vehicle parallel to a kerb. The camera 2 could also be located to the front of the vehicle for capturing a downward looking plan view of the ground adjacent the front of the vehicle, or for capturing an image looking in a generally forward direction from the vehicle. The mounting and operation of such cameras 2 will be well known to those skilled in the art, and further description of the cameras and their mounting should not be required.

However, while the system 1 will be described for calibrating a single camera 2 only, it will be readily understood that the system 1 in practice will be used for substantially simultaneously calibrating a number of cameras, for example, a rearwardly mounted camera and cameras mounted on the respective side mirrors of a vehicle, and a forwardly mounted camera if such is provided. However, for convenience, the system 1 will be described for calibrating a single camera 2 only.

The system 1 comprises a microprocessor 5 which is programmed for carrying out the method according to the invention which is described in detail below. However, before describing the system 1, an outline of the method according to the invention for calibrating the camera 2 will first be given. In this embodiment of the invention the camera 2 is calibrated for offset from the ideal position in the X-Y horizontal plane, and for offset from an ideal angular orientation about the focal axis of the camera. Calibration for offset of the camera 2 from the ideal height above the ground, in other words, along the Z-axis is also provided.

Calibration of the camera 2 is carried out while the vehicle is moving, and the software which carries out the calibration runs in the background while the vehicle is being driven without interfering with the operation of the camera 2 in capturing image data and without interfering with the processing or displaying of images on the visual display screen 4 captured by the camera 2. The system 1 is operable for calibrating the camera 2 during periods while the motor vehicle is being driven at speeds below a predetermined maximum speed, which in this embodiment of the invention is 25 kilometers per hour, in a forward direction, both in a straight line and in an arc, provided that when the vehicle is being driven in an arc the steering angle of the steerable wheels is greater than a predetermined steering angle, which in this case is 20° from the dead-ahead position. However, it will be appreciated that the maximum predetermined speed will be dependent on the rate at which image frames are provided by the camera 2.

The method according to the invention for calibrating the camera 2 requires that the images used for calibration have been corrected for both fisheye distortion and perspective distortion, and have been processed to be downwardly looking plan view images, also commonly referred to as "bird's eye view images" captured by the camera 2 from a virtual position thereof above the vehicle. The calibration method operates in two modes, initially in a find new target mode, and then in a calibration mode.

In the find new target mode, successively received image frames are scanned for an image of an object which would be suitable for tracking through subsequent image frames. Such an image of such an object must be a distinctive image and not one which would be easily confused with images of other objects in the image frame. The system remains in the find new target mode, until an image of such an object, namely, a target object has been identified in an image frame, and that image frame is identified as a reference image frame, the image therein of the target object being a target image. Once the target image and the reference image frame have been identified the system commences to operate in the calibration mode.

In the calibration mode the system predicts the locations at which the image of the target object should appear in the subsequently captured image frames based on the current forward speed of the vehicle and the steering angle of the steerable wheels while the respective subsequent image frames are being captured. The actual locations of the image of the target object in the successive subsequently captured image frames is determined and compared with the predicted locations thereof. If the actual locations of the image of the target object in the respective successively captured image frames coincide with the predicted locations, then the camera 2 is deemed to be correctly calibrated. Otherwise, calibration values are prepared from the average of the difference values between the actual locations of the image of the target object in the successive image frames and the predicted locations thereof resulting from the comparisons during the calibration cycle. The calibration values prepared during each calibration cycle are stored.

During each driving period of the motor vehicle, where the speed of the vehicle and the steering angle of the wheels thereof allow, calibration cycles are carried out. A driving period is a period between activation of the ignition of the vehicle and deactivation thereof. The calibration values from the respective calibration cycles are averaged at the end of the driving period, or a running average of the calibration values may be prepared at the end of each calibration cycle. The average calibration values or the running average of the calibration values obtained during each driving period of the motor vehicle is applied to image frames captured by the camera 2 from the commencement of the next driving period when the ignition of the motor vehicle is again activated, as will be described below.

In order to produce calibration values during each driving period with a degree of confidence, at least a predetermined number of calibration cycles should be carried out while the vehicle is being driven in a straight line dead-ahead direction, and a predetermined number of calibration cycles should be carried out while the vehicle is being driven in an arc. Typically, at least twenty calibration cycles should be carried out in a driving period during which the vehicle is driven in both a straight line dead ahead direction and in an arc. Otherwise, the calibration data prepared during a driving period is ignored.

In order to minimise the computations required in preparing the calibration values during a calibration cycle, only images of objects which appear within a predefined target image area at a predefined location in the respective captured image frames are considered. The predefined target image area is a relatively small area, which in this embodiment of the invention is sixty-four pixels by sixty-four pixels and the predefined location of the predefined target image area is selected so that the comparisons of the actual locations of the image of the selected target object with the predicted location thereof produce optimum results, and that the image of the target object will remain within the image frames for a sufficient number of successively captured image frames.

Figure 2:
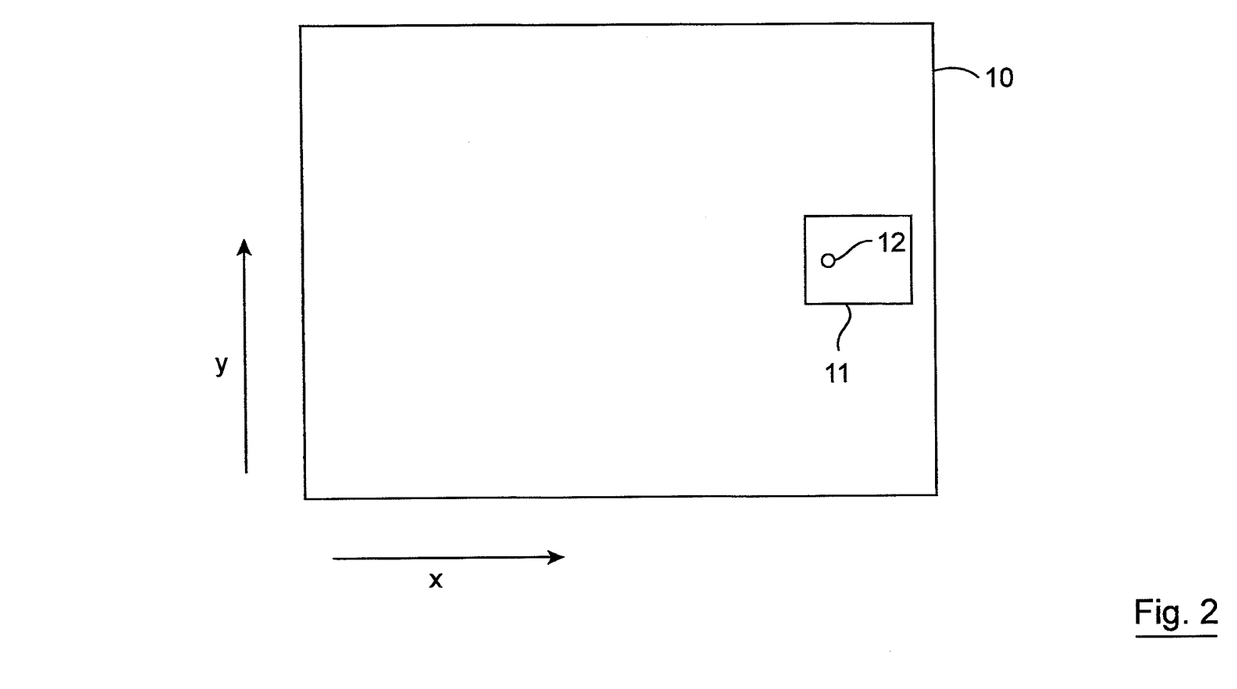
FIG. 2 is a representation of an image frame captured by the image capture device for use in the system of FIG. 1, and FIG. 3(a) to (d) are representations of image frames similar to that of FIG. 2 captured by the image capture device for use in the system during calibration of the image capture device.
Figure 3:
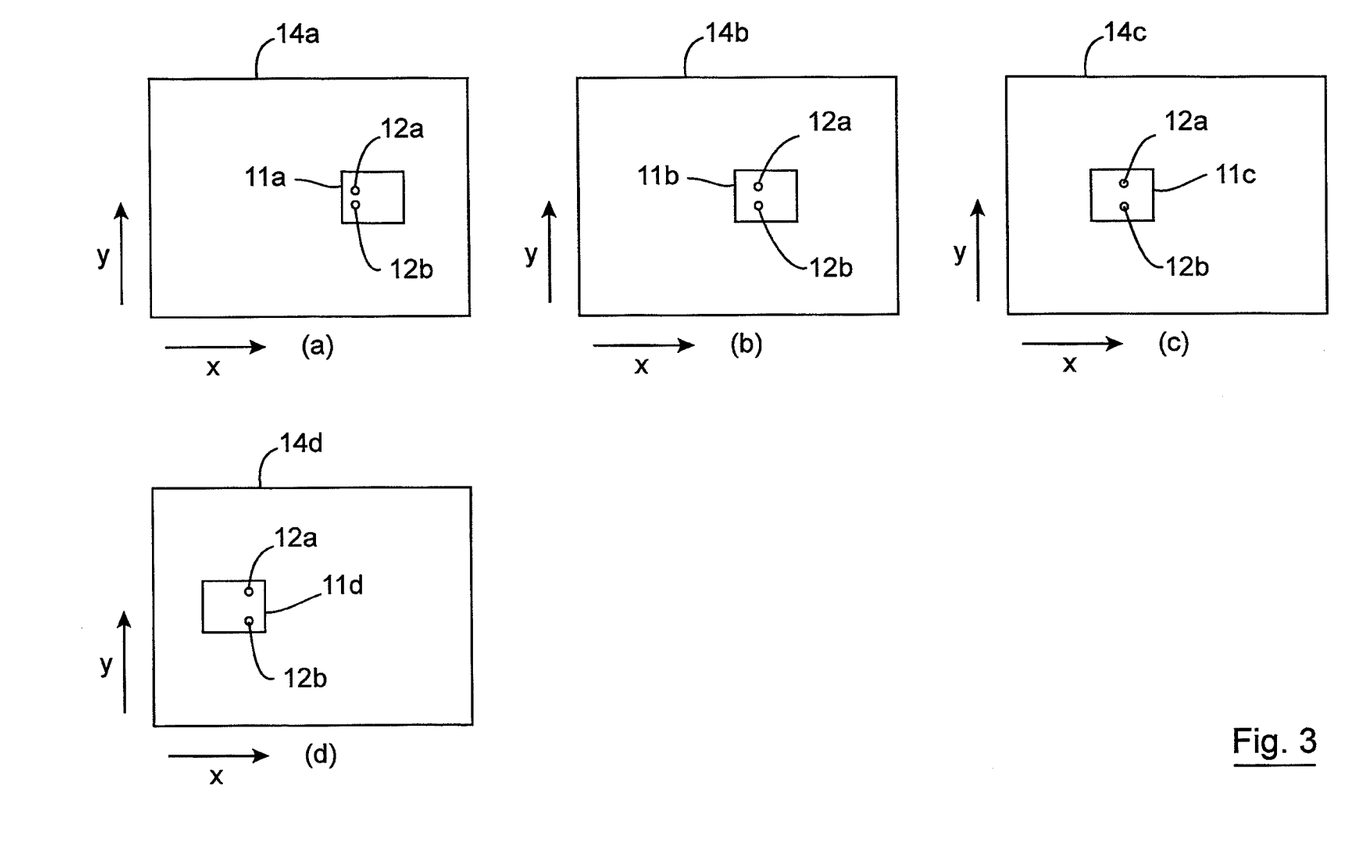

Referring now to FIG. 2, a typical reference image frame 10 captured by the camera 2 is illustrated. The X and Y directions of the image frame 10 are indicated by the arrows X and Y of FIG. 2. The predefined target image area in the captured reference image frame 10 is indicated by the reference numeral 11, and a target image 12, in other words the image of the selected target object is located in the predefined target image area 11. In FIG. 3 (a) to (d) a series of four successive image frames 14a to 14d are illustrated with the predicted locations of the area corresponding to the target image area indicated by the reference numerals 11a to 11d. The actual locations of the images 12a of the target object are illustrated in each predicted area 11a to 11d corresponding to the target image area, and the predicted locations of the images 12b of the target object are illustrated in each predicted area 11a to 11d corresponding to target image area. As can be seen, the actual positions of the images 12a of the target object in the successive image frames 14a to 14d do not coincide with the predicted locations 12b thereof, and the distance between the actual locations of the images 12a of the target object and the predicted locations 12b thereof progressively increases in the successive image frames 14a to 14d.

The difference between the actual location of the image 12a of the target object and the predicted location 12b thereof is computed for each image frame, and the calibration data is prepared from the average of the computed differences between the images 12a and 12b in the respective image frames.

Referring now in particular to FIG. 1, the system 1 comprises a digitising circuit 20 which receives analogue signals representative of the image frames captured by the camera 2 and converts the analogue signals to digital image data in the time domain representative of the captured image frames. Each captured image frame is time stamped by the digitising circuit 20. The digital image data from the digitising circuit 20 is read by the microprocessor 5. A vehicle speed input circuit 21 receives signals from the odometer or other output device of the motor vehicle which produces a signal indicative of the speed of the vehicle. The vehicle speed input circuit 21 processes the signal indicative of the speed of the vehicle and produces a digital signal indicative of the speed of the vehicle which is read by the microprocessor 5. A vehicle direction input circuit 22 receives a signal from the gearshift lever indicative of the forward or reverse gear selected by the gearshift lever, and digitises the signal to produce a digital signal indicative of the direction of motion of the vehicle, which is read by the microprocessor 5. A steering angle input circuit 23 receives signals from a sensor or other suitable monitoring system in the motor vehicle, which are indicative of the steering angle of the steerable wheels of the vehicle, and the steering angle input circuit 23 digitises the signals to produce a digital signal indicative of the steering angle of the steerable vehicle wheels which is read by the microprocessor 5.

The microprocessor 5 is programmed to apply a fisheye correction algorithm 25 to the digital image data received from the digitising circuit 20 in order to correct the captured image frames for fisheye distortion. Fisheye correction algorithms will be well known to those skilled in the art, and further description should not be required. The microprocessor 5 is also programmed to apply a perspective correction algorithm 27 to the fisheye corrected digital image data from the fisheye correction algorithm 25 to correct the captured image frames for perspective distortion. The fisheye and perspective correction algorithms 25 and 27 are stored in the microprocessor 5. A perspective correction look-up table 28 is stored in the microprocessor 5, which is used by the perspective correction algorithm 27 for correcting the fisheye corrected captured image frames for perspective distortion. The correction of such image frames for perspective distortion will be known to those skilled in the art and further description should not be required. The microprocessor 5 is further programmed to apply a plan view conversion algorithm 29 to the fisheye and perspective corrected image frames to produce top plan view images. The plan view conversion algorithm 29 is stored in the microprocessor 5. Plan view conversion algorithms will be known to those skilled in the art, and further description should not be required. An image processing subroutine 30 stored in the microprocessor 5 processes the perspective corrected image frames from the perspective correction algorithm 27 and from the plan view image conversion algorithm 29 for display on the visual display screen 4.

A target image detect subroutine 31 scans the captured image frames which have been corrected for fisheye and perspective distortion and converted to planned view images while the system 1 is in the find new target mode until a target image is detected in an image frame. The target image detect subroutine 31 is programmed to seek out an image of an object in the predefined target image area 11 which has strong visible features which can be identified in successive subsequent image frames when the system 1 is operating in the calibration mode. An object is deemed to be a target object if a steep luminance gradient exists between the image of that object and the area in the image frame adjacent the image of the object. If the target image area 11 of the captured image frame has a high spatial frequency content, it should contain an image of an object suitable to be a target object. The target image detect subroutine 31 determines if the target image area 11 of the currently captured image frame contains an image of object which is suitable as a target object by passing the image data, which is still in the time domain, and which is representative of the predefined target image area 11 of the currently captured image frame through a high pass filter. The high pass filter in this embodiment of the invention is a high pass 3×3 convolution mask, which is implemented in software in the microprocessor 5. If as a result of high pass filtering, the high spatial frequency content of the target image area 11 of the currently captured image frame is greater than a predetermined high spatial frequency content, the target image area 11 of that currently captured image frame is deemed to contain an image of a suitable target object, and the image of the target object is deemed to be a target image, the image frame being deemed to be a reference image frame. The target image detect subroutine records the target image, and stores its X-Y co-ordinates within the predefined target image area 11 in a suitable memory 32 in the microprocessor 5.

Once the reference image frame has been identified and the target image and its position in the predefined target image area 11 of the reference image frame has been identified the microprocessor 5 switches the system 1 from operating in the find new target mode to operate in the calibration mode.

Once operating in the calibration mode, a predict target image area location subroutine 33 stored in the microprocessor 5 predicts the locations in the respective subsequent sequentially captured image frames which have been corrected for fish-eye and perspective distortion and converted to top plan view images at which an image of the area corresponding to the target image area 11 should appear in the respective successively captured image frames. The predict target image area location subroutine 33 predicts the locations in the respective subsequent image frames at which the target image area should appear in response to the speed and direction of travel of the vehicle and the steering angle of the steerable wheels of the vehicle received from the input circuits 21, 22 and 23, and also based on the time stamp of each captured image frame.

The actual images of the areas corresponding to the target image area at the predicted locations in the subsequently captured image frames are compared with the image of the predefined target image area by template matching, which thus determines the difference between the actual location of the image of the target object and the predicted location of the image of the target object in the respective successively captured image frames. Template matching is carried out by the system 1 by converting the image data representative of the predefined target image area 11 of the reference image frame from the time domain to the frequency domain, and also by converting the image data representative of the actual images of the areas corresponding to the target image area at the predicted locations in the successively captured image frames from the time domain to the frequency domain. The image data in the frequency domain representative of the image of the actual area corresponding to the target image area at the predicted location in each one of the successively captured image frames is cross-correlated with the corresponding image data in the frequency domain representative of the predefined target image area 11 of the reference image frame. The difference in the location of the actual image of the target object and the predicted location thereof is determined from the cross-correlation process as will be described below.

A Fast Fourier Transform algorithm 34 is stored in the microprocessor 5, and is initially applied to the image data representative of the predefined target image area 11 of the reference image frame for initially converting the image data representative of the predefined target image area 11 from the time domain to the frequency domain, and then for Fast Fourier Transforming the image data in the frequency domain representative of the predefined target image area 11. The Fast Fourier Transformed image data of the predefined target image area 11 is then stored in a suitable memory 36 in the microprocessor 5.

The image data in the time domain representative of the area corresponding to the target image area at the predicted location in each successively captured image frame of fisheye and perspective corrected plan view images is also converted to the frequency domain and Fast Fourier Transformed by applying the Fast Fourier Transform algorithm 34 to the image data in the frequency domain of the respective areas corresponding to the target image area at the predicted locations of the successively captured image frames.

The Fast Fourier Transformed image data representative of the area corresponding to the target image area at the predicted location of each successively captured image frame is cross-correlated with the corresponding Fast Fourier Transformed image data representative of the predefined target image area 11 of the reference image frame by a cross-correlation algorithm 37, which is stored in the microprocessor 5. The cross-correlation algorithm 37 multiplies the Fast Fourier Transformed image data of the area at the predicted location of the currently captured image frame with the Fast Fourier Transformed image data of the predefined target image area of the reference image frame and then inverse Fast Fourier Transforms the result to produce a joint power spectrum.

A peak value detect algorithm 40 stored in the microprocessor 5 determines the peak value of the peak of maximum peak value in the cross-correlation plane of each joint power spectrum and its X-Y co-ordinates therein. An averaging peak value algorithm 41 stored in the microprocessor 5 computes the average peak value of the peak values of the peaks in the cross-correlation plane. A peak value ratio algorithm 42 stored in the microprocessor 5 computes the ratio of the peak value of the peak of maximum peak value in the cross-correlation plane determined by the peak value detect algorithm 40 to the average peak value computed by the averaging peak value algorithm 41 for each cross-correlation plane produced by the cross-correlation algorithm 37. A valid signal determining algorithm 44 stored in the microprocessor 5 determines if the peak value of the peak of maximum amplitude value in the cross-correlation plane is a valid peak by firstly determining if the peak value of that peak is greater than a predefined threshold peak value, and secondly by determining if the ratio of the peak value of that peak to the average peak value of the peaks in the cross-correlation plane is greater than a predefined threshold ratio value. If the peak value of the peak of maximum peak value exceeds the predefined threshold peak value and the ratio exceeds the predefined threshold ratio value, then the peak of maximum peak value in the cross-correlation plane is deemed to be a valid peak. Otherwise, the peak of maximum peak value is deemed to be an invalid peak.

A difference determining algorithm 45 stored in the microprocessor 5 determines the difference between the location of the peak of maximum peak value in each prepared cross-correlation plane produced by the cross-correlation algorithm 37 with the location of the target image 12 in the predefined target image area 11 of the reference image frame. An averaging differences subroutine 46 stored in the microprocessor 5 averages the difference values determining by the difference determining algorithm 45. A calibration values preparation subroutine 48 stored in the microprocessor 5 determines calibration values from the average difference values produced by the averaging subroutine 46 during each calibration cycle for correcting the camera 2 for offset from the ideal position and for correcting the camera for offset from the ideal angular orientation relative to the focal axis thereof. The calibration values produced by the calibration value preparation subroutine 48 are stored in a suitable memory 49.

The calibration values prepared during each calibration cycle calibrate for offset of the camera 2 from the ideal position in the X-Y horizontal plane and in the Z direction, and also for offset of the camera 2 from the ideal angular orientation relative to the focal axis thereof.

A calibration values averaging subroutine 50 stored in the microprocessor 5 averages the calibration values prepared during each calibration cycle during each driving period of the vehicle. The averaging of the calibration values may be carried out by the averaging subroutine 50 at the end of the driving period, or the averaging may be carried out by the averaging subroutine 50 as a running average as each new set of calibration values is prepared. The average calibration values prepared by the calibration values averaging subroutine 50 are stored in a suitable memory 51 in the microprocessor 5 to be applied to the image frames captured by the camera 5 during the next driving period.

An analysing subroutine 52 stored in the microprocessor 5 analyses the average calibration values stored in the memory 51 on the activation of the ignition on the next driving period. If the average calibration values are less than predefined values, an updating subroutine 53 stored in the microprocessor 5 updates the perspective correction look-up table 28 by inserting the average calibration values stored in the memory 51. If, however, the average calibration values exceed the corresponding predetermined calibration values, the updating subroutine 53 when updating the perspective correction look-up table 28 inserts calibration values up to the predetermined values of the respective calibration values into the perspective correction look-up table 28. By limiting the updating of the perspective correction look-up table 28 to the predetermined calibration values, over-correction for the offsets is avoided.

In use, during periods while the vehicle is moving in a forward dead-ahead direction and the speed of the vehicle is below the predetermined maximum speed of 25 kilometers per hour a calibration cycle is commenced. Additionally, during periods while the vehicle is moving at a forward speed below 25 kilometers per hour and the steering angle of the steerable wheels is greater than the predetermined steering angle of 20°, a calibration cycle is also commenced. Otherwise, the next calibration cycle is deferred until the vehicle is driving at a forward speed below 25 kilometers per hour in a straight line or in an arc with the steerable wheels at an angle greater than 20°.

While in the description of the preferred embodiment of the system according to the invention, the maximum speed of the vehicle at which calibration can be carried out has been described as being 25 kilometers per hour, the maximum speed will depend on a number of variables, including the rate at which image frames are captured by the camera, and the rate at which the computations can be carried out by the system according to the invention.

Additionally, the minimum angle of the steerable wheels at which a calibration can be carried out while the vehicle is moving in an arc may also vary.

While the comparison between the actual image of the area at the predicted location corresponding to the predefined target image area is compared with the predefined image area of the reference image frame for each successive image frames by using Fast Fourier Transforms, other suitable methods for comparison may be used. Additionally, while only an area corresponding to the target image area in the successive image frames and the predefined target image area in the reference image frame are used for comparison, in certain cases, the entire captured image frame could be used. However, by utilising only a relatively small part of the captured image frame for comparison, the computation time required by the system, and the computational power required by the system are significantly reduced. However, since in the present embodiment of the invention, the comparison is carried out by Fast Fourier Transforming the image data of the respective target image areas, the target image areas should be of area in the order of $2^x$ and $2^y$, where x and y are integers greater than zero, in order to facilitate the Fast Fourier Transformations of the image data.

The invention claimed is:

1. A method for calibrating an image capture device mounted on a vehicle for offset from at least one of an ideal position and an ideal angular orientation about a focal axis of the image capture device while the vehicle is moving, the method comprising:
   selecting an image frame captured by the image capture device as a reference image frame when image data thereof in a time domain in at least one portion of the image frame is indicative of a high spatial frequency content greater than a predefined high spatial frequency content, wherein the image capture device is non-stereoscopic;
   selecting, as a target image, an image of a stationary object in an environment external of the vehicle in the reference image frame suitable as a target object;

predicting a location at which an image of the target object should appear in a subsequently captured image frame in response to at least one parameter of the moving vehicle;

comparing the actual location of the image of the target object in the subsequently captured image frame with the predicted location thereof, wherein the image frame and the subsequently captured image frame are both captured by the same image capture device;

determining from the comparison of the actual and the predicted locations of the images of the target object whether the image capture device is offset from the at least one of the ideal position and the ideal angular orientation; and determining calibration data from the difference between the actual and the predicted locations of the image of the target object for applying a change in the field of view of the image capture device to image frames later captured by the image capture device for correcting the later captured image frames for the offset of the image capture device from the at least one of the ideal position and the ideal angular orientation when the image capture device is determined to be offset therefrom, wherein the at least one parameter of the moving vehicle is a steering angle input, wherein the captured image frames are initially corrected for at least one selected from a group consisting of perspective distortion and fisheye distortion, wherein the target image is selected from an area of predefined size forming a target image area in the reference image frame, wherein the location at which the image area corresponding to the target image area should appear in each of the subsequently captured image frames is predicted, and the actual image of the area corresponding to the target image area at the predicted location in each of the subsequently captured image frames is compared with the target image area for determining the difference between the actual location of the image of the target object with the predicted location thereof, wherein the actual image of the area corresponding to the target image area at the predicted location in each of the subsequently captured image frames is compared with the target image area by comparing image data in a frequency domain representative of the actual image of the area corresponding to the target image area at the predicted locations with image data in a frequency domain representative of the target image area, wherein the image data in the frequency domain representative of the actual image of the area corresponding to the target image area at the predicted location in each of the subsequently captured image frames is compared with the image data in the frequency domain representative of the target image area by a cross-correlation process to produce a joint power spectrum of the actual image of the area at the corresponding predicted location and the target image area, and wherein the location of a peak of maximum peak value in a correlation plane of each joint power spectrum is used for determining the difference between the actual location of the image of the target object and the predicted location thereof for the corresponding subsequently captured image plane.

2. The method as claimed in claim 1, wherein the locations at which the images of the target object should appear in a plurality of respective subsequently captured image frames are predicted, and the actual locations of the images of the target object in the subsequently captured image frames are compared with the corresponding predicted locations thereof.

3. The method as claimed in claim 2, wherein the differences between the actual locations of the images of the target object and the predicted locations thereof in the respective subsequently captured image frames are averaged for determining the calibration data.

4. The method as claimed in claim 2, wherein the subsequently captured image frames are sequentially captured image frames.

5. The method as claimed in claim 4, wherein at least some of the image data in the time domain representative of the captured image frames is passed through a high pass filter for determining if the image frame contains a target image.

6. The method as claimed in claim 1, wherein the location of the target image area in the reference image frame is at a predefined location therein.

7. A method for calibrating an image capture device mounted on a vehicle for offset from at least one of an ideal position and an ideal angular orientation about a focal axis of the image capture device while the vehicle is moving, the method comprising:

selecting an image frame captured by the image capture device as a reference image frame when image data thereof in a time domain in at least one portion of the image frame is indicative of a high spatial frequency content greater than a predefined high spatial frequency content, wherein the image capture device is non-stereoscopic;

selecting, as a target image, an image of a stationary object in an environment external of the vehicle in the reference image frame suitable as a target object;

predicting a location at which an image of the target object should appear in a subsequently captured image frame in response to at least one parameter of the moving vehicle;

comparing the actual location of the image of the target object in the subsequently captured image frame with the predicted location thereof, wherein the image frame and the subsequently captured image frame are both captured by the same image capture device;

determining from the comparison of the actual and the predicted locations of the images of the target object whether the image capture device is offset from the at least one of the ideal position and the ideal angular orientation; and determining calibration data from the difference between the actual and the predicted locations of the image of the target object for applying a change in the field of view of the image capture device to image frames later captured by the image capture device for correcting the later captured image frames for the offset of the image capture device from the at least one of the ideal position and the ideal angular orientation when the image capture device is determined to be offset therefrom, wherein the at least one parameter of the moving vehicle is a steering angle input, wherein the captured image frames are initially corrected for at least one selected from a group consisting of perspective distortion and fisheye distortion, wherein the target image is selected from an area of predefined size forming a target image area in the reference image frame, and wherein the location at which the image area corresponding to the target image area should appear in each of the subsequently captured image frames is predicted, and the actual image of the area corresponding to the target image area at the predicted location in each of the subsequently captured image frames is compared with the target image area for determining the difference between the actual location of the image of the target object with the predicted location thereof, wherein the actual image of the area corresponding to the target image area at the predicted locations in each of the subsequently captured image frames is compared with the target image area by a template matching process, wherein the actual image of the area corresponding to the target image area at the predicted location in each of the subsequently captured image frames is compared with the target image area by comparing image data in a frequency domain representative of the actual image of the area corresponding to the target image area at the predicted locations with image data in a frequency domain representative of the target image area, wherein the actual image of the area corresponding to the target image area at the predicted location in each of the subsequently captured image frames is compared with the target image area by comparing image data in a frequency domain representative of the actual image of the area corresponding to the target image area at the predicted locations with image data in a frequency domain representative of the target image area, wherein the image data in the frequency domain representative of the actual image of the area corresponding to the target image area at the predicted location in each of the subsequently captured image frames is compared with the image data in the frequency domain representative of the target image area by a cross-correlation process to produce a joint power spectrum of the actual image of the area at the corresponding predicted location and the target image area, and wherein the location of a peak of maximum peak value in a correlation plane of each joint power spectrum is used for determining the difference between the actual location of the image of the target object and the predicted location thereof for the corresponding subsequently captured image plane.

8. The method as claimed in claim 1, wherein the location of the image of the target object in each of the subsequent image frames is predicted in response to at least one of the following parameters of the moving vehicle:
the forward/rearward direction of movement of the vehicle,
the speed of movement of the vehicle, and
the steering angle of the steerable wheels of the vehicle.

9. The method as claimed in claim 1, wherein the captured image frames are initially corrected for at least one selected from a group consisting of perspective distortion and fisheye distortion, and wherein the captured image frames are subsequently converted to top plan view images prior to being processed by the calibration method.

10. A system for calibrating an image capture device mounted on a vehicle for offset from at least one of an ideal position and an ideal angular orientation while the vehicle is moving, the system comprising:
a microprocessor programmed to perform operations comprising:
selecting an image frame captured by the image capture device as a reference image frame, when image data thereof in a time domain in at least one portion of the image frame is indicative of a high spatial frequency content greater than a predefined high spatial frequency content, wherein the image capture device is non-stereoscopic;
selecting as a target image an image of a stationary object in an environment external of the vehicle in the reference image frame suitable as a target object;
predicting a location at which an image of the target object should appear in a subsequently captured image frame in response to at least one parameter of the moving vehicle;
comparing the actual location of the image of the target object in the subsequently captured image frame with the predicted location thereof, wherein the image frame and the subsequently captured image frame are both captured by the same image capture device;
determining from the comparison of the actual and the predicted locations of the images of the target object whether the image capture device is offset from the at least one of the ideal position and the ideal angular orientation; and
determining calibration data from the difference between the actual and the predicted locations of the images of the target object for applying a change in the field of view of the image capture device to image frames later captured by the image capture device for correcting the later captured image frames for the offset of the image capture device from the at least one of the ideal position and the ideal angular orientation when the image capture device is determined to be offset therefrom,
wherein the at least one parameter of the moving vehicle is a steering angle input,
wherein the captured image frames are initially corrected for at least one selected from a group consisting of perspective distortion and fisheye distortion,
wherein the target image is selected from an area of predefined size forming a target image area in the reference image frame, wherein the location at which the image area corresponding to the target image area should appear in each of the subsequently captured image frames is predicted, and the actual image of the area corresponding to the target image area at the predicted location in each of the subsequently captured image frames is compared with the target image area for determining the difference between the actual location of the image of the target object with the predicted location thereof,
wherein the image data in the frequency domain representative of the actual image of the area corresponding to the target image area at the predicted location in each of the subsequently captured image frames is compared with the image data in the frequency domain representative of the target image area by a cross-correlation process to produce a joint power spectrum of the actual image of the area at the corresponding predicted location and the target image area, and
wherein the location of a peak of maximum peak value in a correlation plane of each joint power spectrum is used for determining the difference between the actual location of the image of the target object and the predicted location thereof for the corresponding subsequently captured image plane.

11. The system as claimed in claim 10, further comprising a plurality of non-stereoscopic image capture devices mounted on the vehicle, wherein respective captured image frames from the plurality of non-stereoscopic image capture devices are converted to top plan view images capable of being displayed together in a display screen of the vehicle.

12. The system as claimed in claim 11, wherein image frames are captured from at least one non-stereoscopic image capture device mounted rearwardly or forwardly on the vehicle,
wherein image frames are captured from at least one non-stereoscopic image capture device mounted on a side of the vehicle, and
wherein the respective image frames from the at least one non-stereoscopic image capture device mounted rearwardly or forwardly on the vehicle and from the at least one non-stereoscopic image capture device mounted on the side of the vehicle are converted to top plan view images capable of being displayed together in a display screen of the vehicle.

13. The method as claimed in claim 1, wherein image frames are captured from a plurality of non-stereoscopic image capture devices mounted on the vehicle, and wherein respective captured image frames from the plurality of non-stereoscopic image capture devices are converted to top plan view images capable of being displayed together in a display screen of the vehicle.

14. The method as claimed in claim 13, wherein image frames are captured from at least one non-stereoscopic image capture device mounted rearwardly or forwardly on the vehicle, wherein image frames are captured from at least one non-stereoscopic image capture device mounted on a side of the vehicle, and wherein the respective image frames from the at least one non-stereoscopic image capture device mounted rearwardly or forwardly on the vehicle and from the at least one non-stereoscopic image capture device mounted on the side of the vehicle are converted to top plan view images capable of being displayed together in a display screen of the vehicle.

\* \* \* \* \*